United States Patent [19]

Ulbrich

[11] Patent Number: 6,011,374
[45] Date of Patent: Jan. 4, 2000

[54] METHOD AND APPARATUS FOR POSITIONING AND/OR SPEED CONTROL OF MACHINE TOOL AXES

[75] Inventor: Dieter Ulbrich, Abstatt, Germany

[73] Assignee: Gleason-Pfauter Maschinenfabrik GmbH, Ludwigsburg, Germany

[21] Appl. No.: 09/033,983

[22] Filed: Mar. 3, 1998

[30] Foreign Application Priority Data

Mar. 5, 1997 [GB] United Kingdom ................ 19708894

[51] Int. Cl.[7] .................................................. G05B 19/18
[52] U.S. Cl. ......................................... 318/569; 364/474.3
[58] Field of Search ................................ 318/615, 568.16, 318/568.17, 568.18, 568.22, 568.15, 569, 632, 623, 652, 574, 575; 364/474.28, 474.35, 474.3, 474.15

[56] References Cited

U.S. PATENT DOCUMENTS

| | | | |
|---|---|---|---|
| 4,710,865 | 12/1987 | Higomura | 364/167.01 |
| 5,021,941 | 6/1991 | Ford et al. | 364/176 |
| 5,107,193 | 4/1992 | Iwashita | 318/560 |
| 5,248,921 | 9/1993 | Kato et al. | 318/560 |
| 5,448,145 | 9/1995 | Iwashita | 318/568.15 |
| 5,519,297 | 5/1996 | Kono et al. | 318/594 |
| 5,691,616 | 11/1997 | Iwashita | 318/615 |

*Primary Examiner*—Jonathan Salata
*Attorney, Agent, or Firm*—Robert L. McDowell

[57] ABSTRACT

A method of controlling the positioning and/or speed of axes on a machine tool as well as an apparatus for carrying out the method. The inventive method controls the positioning and/or speed of fast-rotating, high-accuracy orbital axes (i.e. rotational axes) of a gear-manufacturing machine, wherein a standard NC is used. The inventive method and apparatus are realized by the inclusion of a second control system which is provided in addition to the standard NC and is structured such that the known aliasing effects generated by underscanning and the limitation of the dynamics by the cycle times are avoided or considerably reduced. By application of the inventive method, higher accuracy can be attained while maintaining the full functional scope of the standard NC.

18 Claims, 5 Drawing Sheets

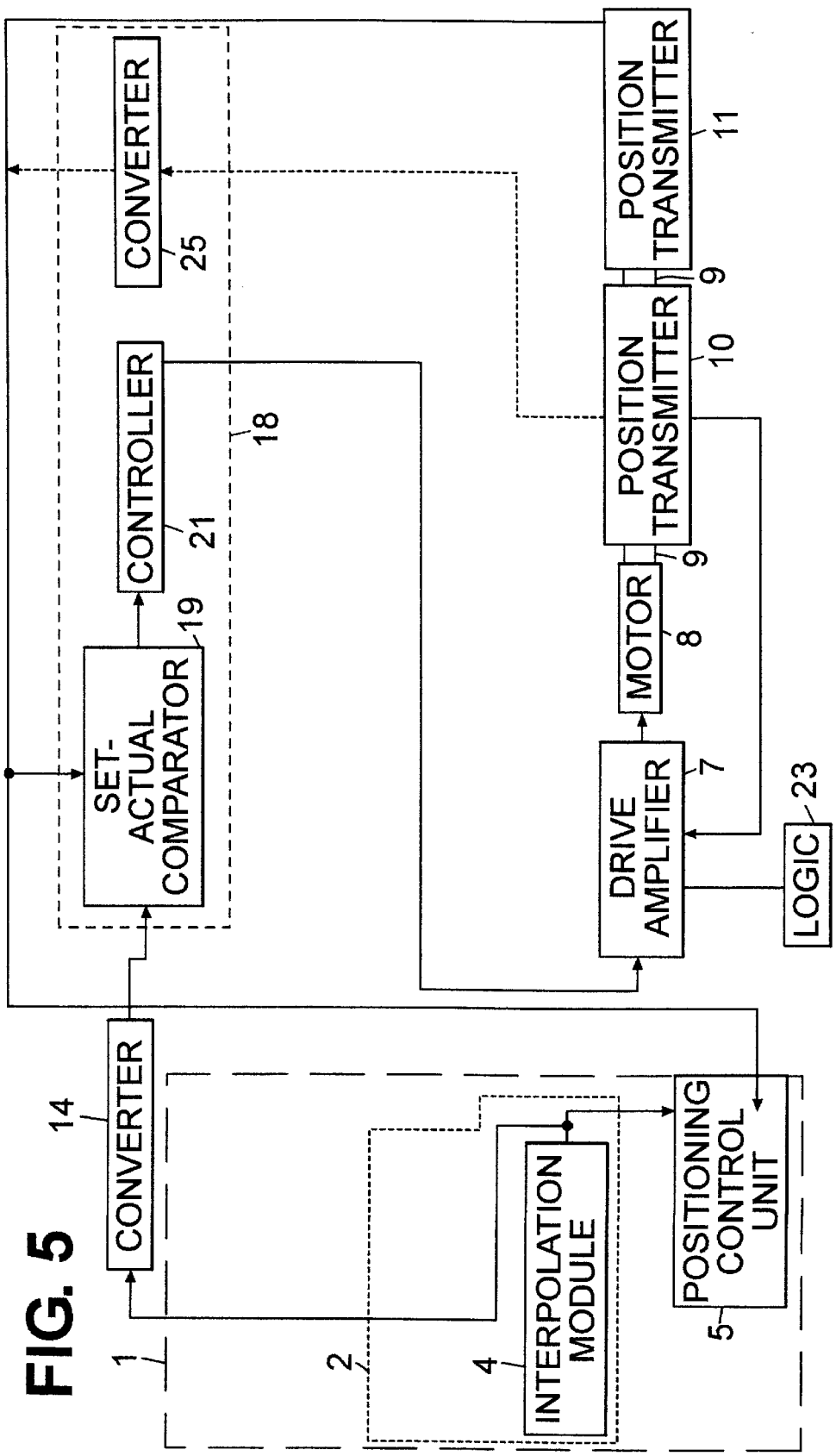

METHOD AND APPARATUS FOR POSITIONING AND/OR SPEED CONTROL OF MACHINE TOOL AXES

FIELD OF THE INVENTION

The invention relates to a method for positioning and/or speed control of axes of a machine tool as well as an apparatus for the application of such method.

BACKGROUND OF THE INVENTION

It is known that in standard numerical positioning and speed controls, due to the scanning and interpolation of the measured signals for high-resolution positioning/speed detection, aliasing creates rotational irregularities, which for fast-rotating, high-accuracy axes are no longer negligible and that, furthermore, the dynamics is limited by the cycle time.

In comparison, there are measuring and control methods known which are not associated with these disadvantages, preferably analog or quasi-analog methods. Exemplary mention is made of the phase comparison of transmitter signals with set value signals of same signal shape. But these are incompatible with the concept of a standard numerical control (NC) and, in turn, cannot be provided with the full functional scope of a standard NC at justifiable expense.

The objective underlying the invention is to configure the categorical method and the categorical apparatus such that, for one, the advantages of higher accuracy can be utilized and, for another, the full functional scope of standard NC is maintained.

SUMMARY OF THE INVENTION

At least the control of one numerically controlled axis is performed in the inventional method by a second control system, which is provided in addition to the standard numerically controlled axis. The second control system has a structure such that the known aliasing effects generated by underscanning and the dynamics limitation by the cycle times are avoided or at least reduced distinctly. The numerical control (NC) internal numerical positioning set value for the external control unit is by means of the positioning control in the NC converted to serial pulses or serial sinusoidal signals in that its speed actuating variable activates a voltage-controlled generator. The latter generates the desired output signal, which is converted back again to the sinusoidal signal required for the actual-value input and looped back to the actual-value input of the NC positioning control.

The supplemental control system is in the inventional apparatus connected to the standard NC and supplied with the positioning set value present in the NC. Rotational irregularities due to aliasing effects and a dynamics limitation by the cycle times are thereby avoided or least reduced distinctly. At the same time, the full functional scope of the standard NC with respect to the axis continues to be available for utilization.

The invention is more fully explained with the aid of several exemplary embodiments illustrated in the drawings.

BRIEF DESCRIPTION OF THE DRAWINGS

FIG. 5 schematically illustrates a fourth exemplary embodiment of the inventional apparatus.

DETAILED DESCRIPTION OF THE PREFERRED EMBODIMENTS

Figure 1:
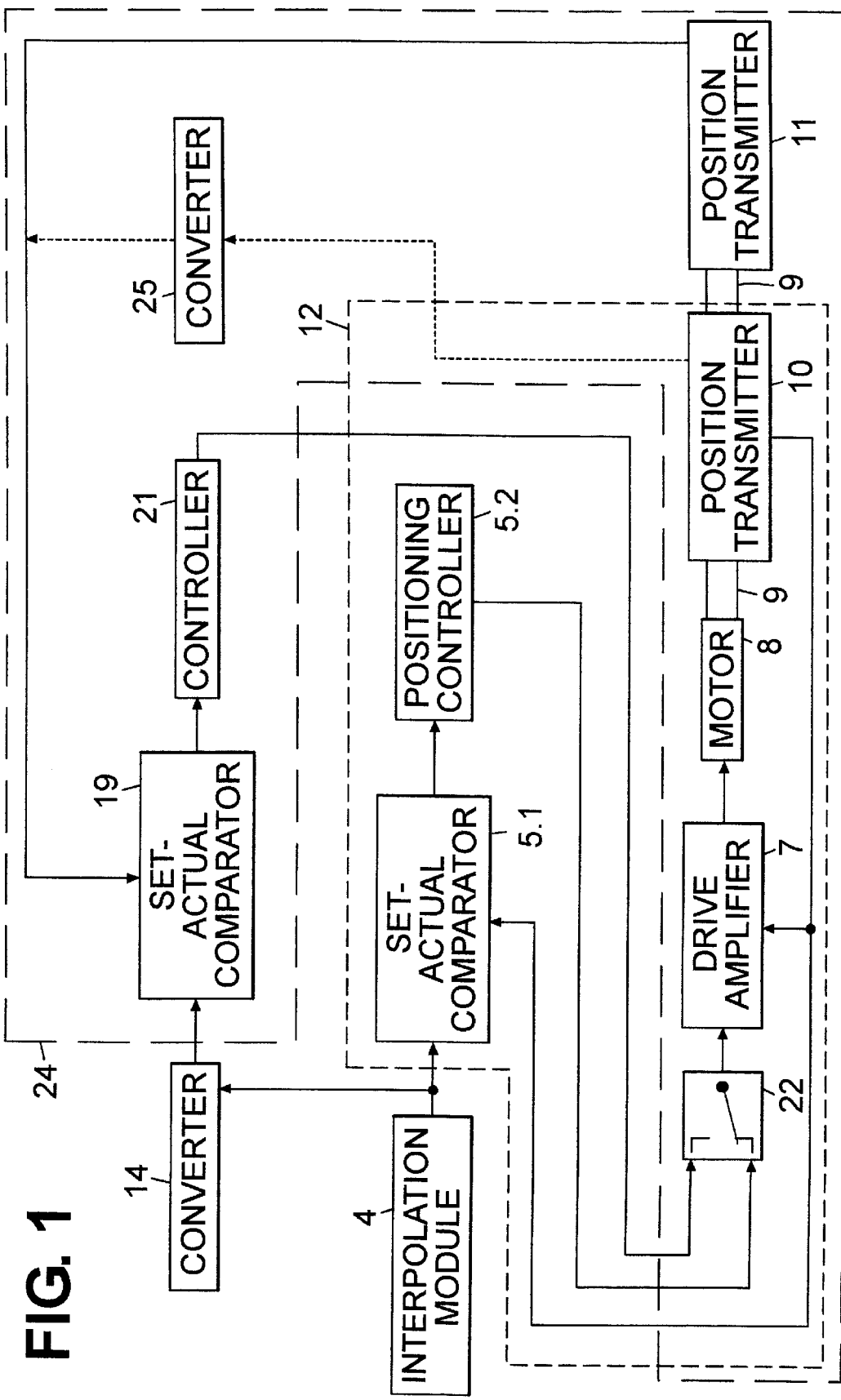
FIG. 1 schematically illustrates the method underlying the invention.
Figure 2:
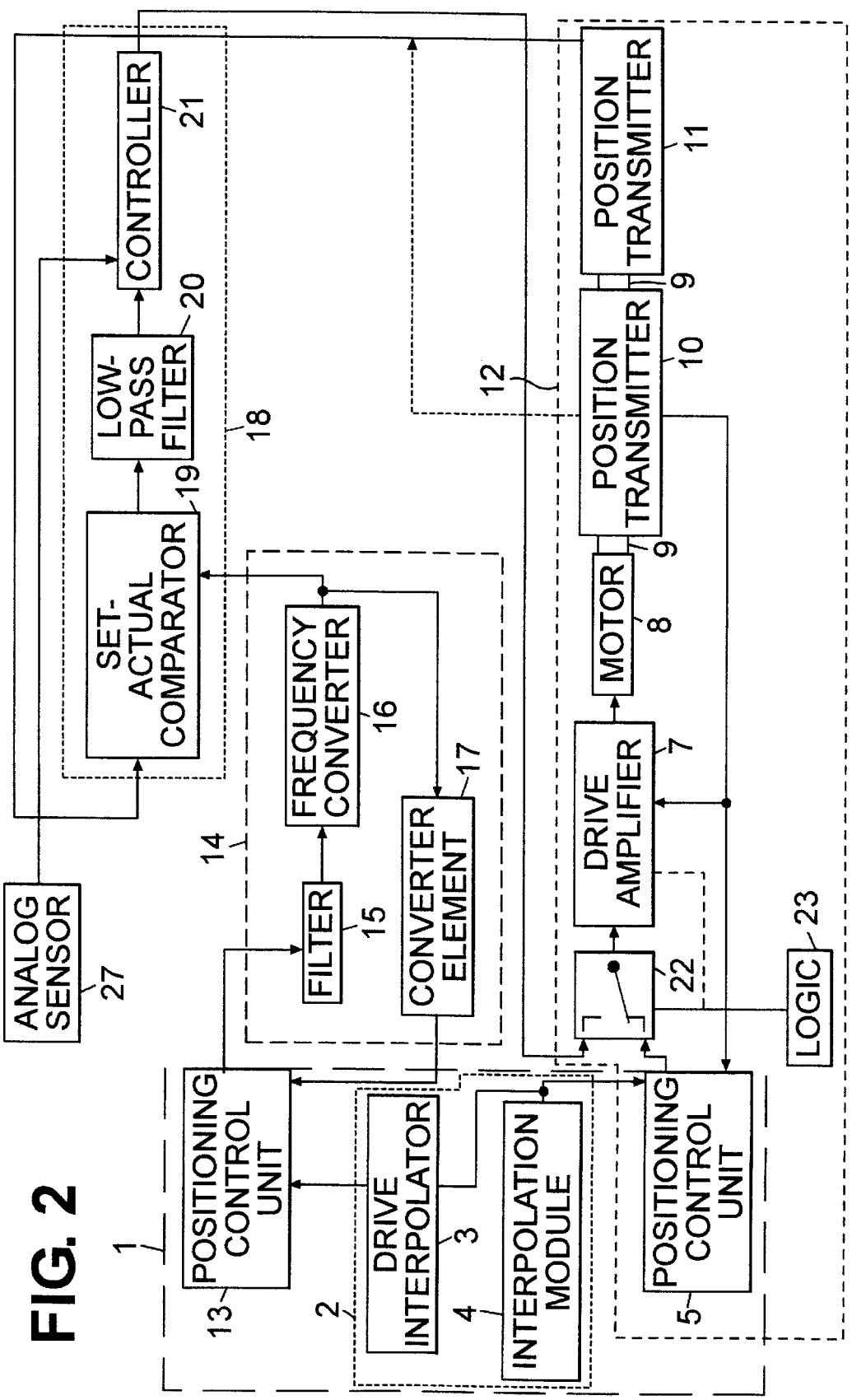
FIG. 2 illustrates a first exemplary embodiment of the inventional apparatus.

As illustrated schematically in FIG. 1, a supplemental control system is for the formation of a positioning control loop 24 installed in an apparatus, in addition to a standard, existing positioning control loop 12 of an NC axis, said loop comprising as components the drive amplifier 7, motor 8, mechanical axis 9, position transmitter 10 and a set-actual comparator 5.1 with positioning controller 5.2 integrated in the NC 1 (FIG. 2). The control system comprises as components the position transmitter 11, which detects the positioning actual value of axis 9 in a signal shape required for the supplemental control system, or a converter 25 converting the signals of the position transmitter 10 to the required signal shape, as well as a set-actual comparator 19 and a controller 21. A converter 14 converts the positioning set value generated by an interpolation module 4 of NC 1 (FIG. 2) to a shape suited for the set-actual comparator 19. Controller 21 converts the output signal of the set-actual comparator 19 to an actuating variable for the drive amplifier 7. In keeping with the requirements for the control, a switch 22 switches the drive amplifier 7 over to the actuating variable. Since the controlled axis, after being switched to the actuating variable from controller 21, continues to be held by the now closed external control loop 24 in the set position of the interpolation module 4, and the actual position of axis 9 continues to be looped back via the position transmitter 10 to NC 1 for processing, nothing has changed for the sequence in NC 1. This means that all of the functions of NC 1 with respect to axis 9, e.g., monitoring functions, absolute-value processing, path control, corrections etc., and thus also existing NC programs, continue to be available for utilization.

The positioning actual value is in the supplemental control method detected via a position transmitter with rectangular signals and compared with a set value of same signal shape, with respect to its phase position relative to said set value. The analog differential signal created is used for positioning and speed control. The numerical positioning set value of the NC is by way of a suitable apparatus converted to the required signal shape. However, also other measuring and comparison methods satisfying the objective may be applied. Mention is made of sinusoidal actual-value detection and analog phase comparison, numerical formation of the set-actual deviation etc. Accordingly, other converters may also be employed.

The basic structure is shown in FIG. 2 with the aid of an exemplary embodiment. The usually existing structure of an NC-controlled orbital axis is illustrated under 12. The mechanical axis 9 to be controlled is an orbital axis driven by the motor 8. Joined rigidly to the axis 9 is the position transmitter 10. It delivers sinusoidal signals, which in the positioning control unit 5 are interpolated repeatedly for high resolution of the position. The positioning set value is generated in the interpolation module 4 of NC 1, the latter illustrated only in part, and passed to the positioning control unit 5. Here, the positioning set value is compared with the interpolated positioning actual value of the position transmitter 10. The difference is weighted using suitable control factors and transmitted as analog speed set value to the subordinate speed control system in the drive amplifier 7.

The same measuring system 10 as for detecting the position is for reasons of accuracy usually used for high-accuracy speed detection. The known method of speed control in the drive amplifier 7 is not illustrated in detail. This usual arrangement has the disadvantages that the scanning and interpolation of the measured signals for the high-resolution position/speed detection creates, due to aliasing, rotational irregularities which for fast-rotating, high-accuracy axes are no longer negligible and that, moreover, the cycle time limits the dynamics.

According to the invention, therefore, a further positioning or positioning and speed control is added. For its activation, the numerical positioning set value of NC 1 needs to be converted to the suitable signal shape. To that end, an interpolator 2 of NC 1 generates by means of a known method of drive interpolation, in a drive interpolator 3 with constant coupling factor, a positioning set value that equals the set position on the output of the interpolation module 4. This positioning set value is in a positioning control unit 13 compared with an actual value looped back by the converter 14 to the actual-value input of the positioning control unit 13. The difference is valued using suitable control factors and passed to the converter 14 as actuating variable. To smooth out quantification jumps, the actuating variable is in the converter 14 passed through a filter 15 and converted in a frequency converter 16 to a serial pulse sequence with directional information, for further processing in a supplemental control unit 18. A converter element 17 of converter 14 converts this pulse sequence in keeping with the specification of the transmitter interface of the positioning control unit 13, in turn, to very pure sinusoidal signals. Due to the control loop closed via the feedback and due to suitable controller parameters, the set value generated by the voltage-frequency converter 16 corresponds with the positioning set value of the interpolation module 4.

The control proper of axis 9 occurs in the control unit 18. The position of axis 9 is via the second position transmitter 11 detected, with rectangular signals, and looped back to the set-actual comparator 19. With sufficient accuracy, also the signal of the position transmitter 10 can be used, by converting it to rectangular signals. The set-actual comparison is carried out in the set-actual comparator 19 after the fashion of the pulse-phase comparison and yields a signal pulse-width-modulated with the positioning differential and having a frequency proportional to the pulse sequence of the position transmitter 11. Ranging far beyond the response frequency of the controlled system, these frequency portions are filtered out by means of a suitable low-pass 20. The resulting positioning control deviation is in the controller unit 21 valued using suitable control factors and passed as actuating variable, via switch 22, to the drive amplifier 7, provided the switch 22 is in the appropriate position.

Furthermore, the speed differential can be generated by analog differentiation of the positioning control deviation in the controller unit 21, and the speed controller can be integrated in said controller unit 21. This allows avoiding the above unfavorable effects also in the speed detection. When using this variant, the drive amplifier 7 is by an adaptation logic 23 switched to moment control.

There are methods of pulse-phase comparison which are suited only for a frequency range of the position transmitter 11 far above the response frequency of the control system. As a consequence, the supplemental control system is in this case unsuited for the standstill and startup of axis 9. Therefore, depending on the state of the process, the adaptation logic 23 switches, via switch 22, between the actuating variable of the positioning control unit 5 and the actuating variable of the supplemental control unit 18. The present application demands during machining a high rotational regularity with near-constant speed.

In addition to achieving a better control behavior, the invention offers the option of superimposing in real time, with simple means via analog addition, positioning and/or speed correction variables analogous to the input signal of the controller unit 21, for example, variables detected by way of analog sensors 27.

Since axis 9, after being switched to the actuating variable of the control unit 18, continues to follow, via drive interpolator 3, positioning control unit 13, converter 14 and supplemental control unit 18, the set value of the interpolation module 4 and the actual-value input of the positioning control unit 5 receives the positioning actual-value of axis 9, all of the NC functions with respect to axis 9, for example, monitoring functions, absolute-value processing, path control, corrections etc., and thus also existing NC programs, continue to be available for further use.

Figure 3:
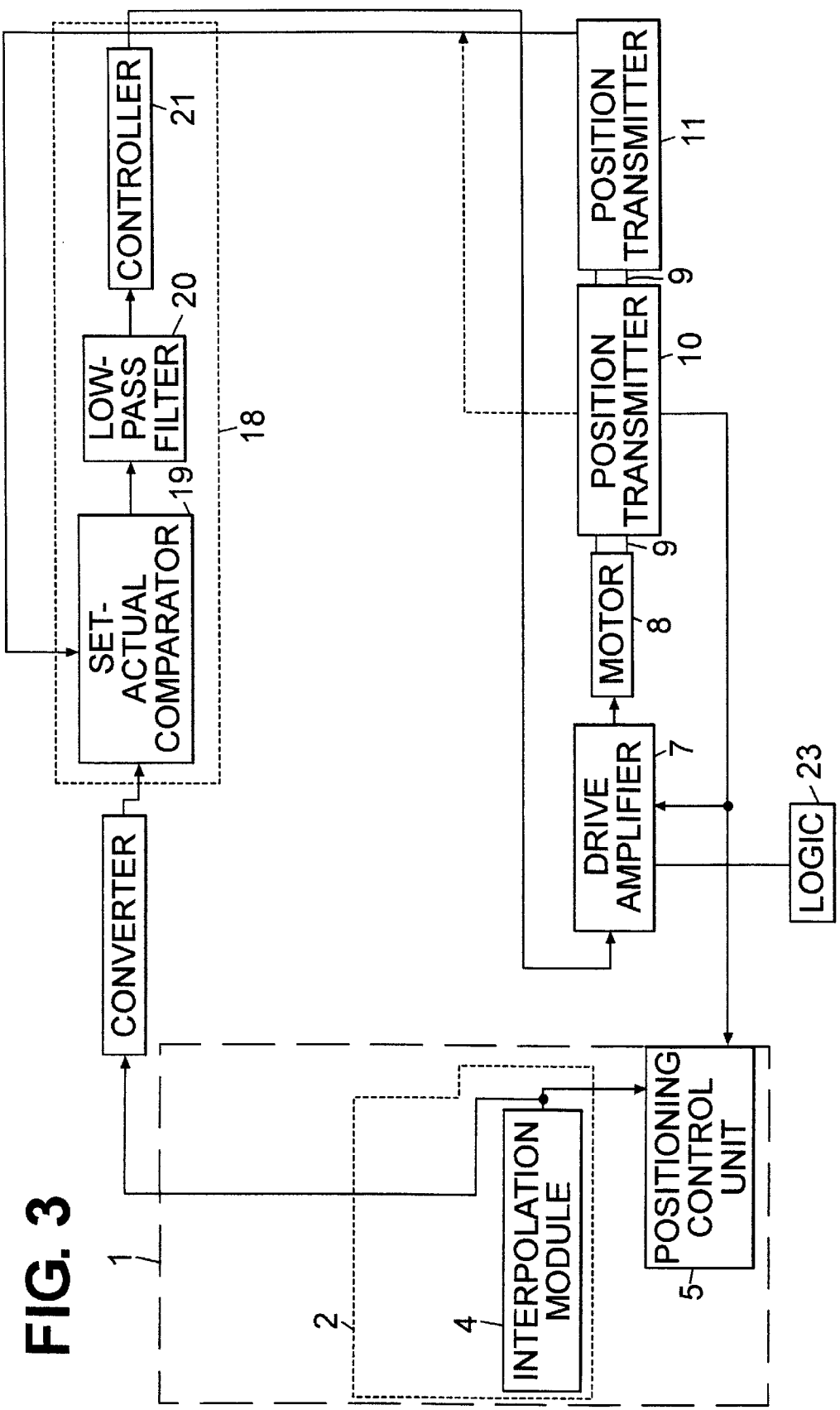
FIG. 3 is a schematic illustration of a second exemplary embodiment of the inventional apparatus.

FIG. 3 shows an embodiment in which the numerical positioning set value of interpolation module 4 is passed directly to the converter 14 and converted to the positioning set value for the supplemental control unit 18.

If the supplemental control system is suited as well for positioning and startup of the axis, switch 22 (FIG. 1) is dispensable. The output signal of the supplemental control unit 18 is passed directly to the drive amplifier 7. The connection between positioning control unit 5 and switch 22 is dispensable.

If the supplemental control unit 18 is a numerically operating system possessing the required properties, also the positioning actual value, converted by the converter 25 to a numerical value, can be looped back directly to the positioning control unit 5 of NC 1, as illustrated in FIG. 5.

Figure 4:
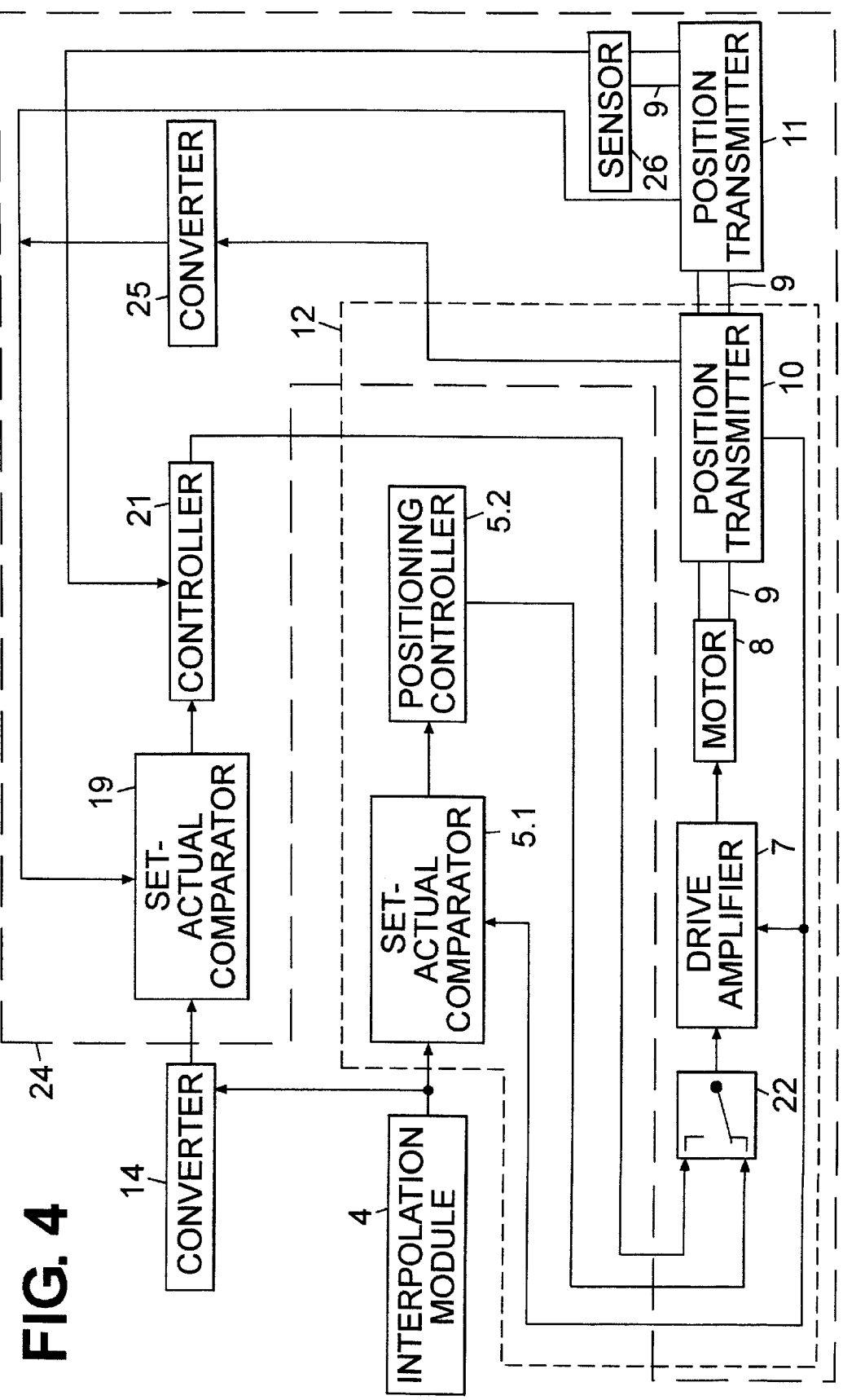
FIG. 4 schematically illustrates a third exemplary embodiment of the inventional apparatus.

FIG. 4 shows an embodiment matching in its configuration nearly the exemplary embodiment relative to FIG. 1. The only difference is constituted by having connected to axis 9 a sensor 26 for measuring the speed, or acceleration, basing for instance on the Ferraris principle. The output signal of sensor 26 is for speed control looped back to the controller unit 21.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for positioning and/or speed control of at least one axis of a machine tool having a numerical control and a first control system for said at least one axis, said apparatus comprising:

a second control system in addition to said first control system, said second control system having a structure to effect a reduction in aliasing effects due to underscanning and dynamics limitation due to cycle times, said first control system and said second control system operating alternatively with respect to one another to control said at least one axis of said machine tool.

2. The apparatus according to claim I wherein said second control system comprises:

a position transmitter, a set-actual comparator, and, a controller.

3. The apparatus according to claim 2 wherein:

said first control system includes a drive amplifier and a motor for said at least one axis, said numerical control includes an interpolation means for generating a positioning set value and a position control, said second system includes a converter to convert the positioning set value to a form compatible with said comparator.

4. The apparatus of claim 3 wherein said comparator provides an actuating variable to said amplifier.

5. The apparatus of claim 3 wherein said second control system further comprises converting means wherein said positioning set value is converted to serial pulses or serial sinusoidal signals which are provided to said comparator, said signals or pulses being converted back to a sinusoidal signal required for an actual-value input of said positioning control and being looped back to the actual-value input of said positioning control.

6. A method for positioning and/or speed control of at least one axis on a machine tool having a numerical control communicating with a first control system, said method comprising:

providing said at least one axis with a second control system in addition to said first control system, said second control system communicating with said numerical control and having a structure whereby aliasing effects due to underscanning and dynamics limitation due to cycle times are reduced, said first control system and said second control system operating alternatively with respect to one another to control said at least one axis of said machine tool, providing a positioning set value from said numerical control, converting said positioning set value to a signal shape required by said second control system, generating an actual positioning value in a signal shape required for said second control system, determining a differential between said actual value and said set value and providing an actuating value based on said differential, providing said actuating value to a drive amplifier of said at least one axis, moving said axis in accordance with said actuating value provided to said drive amplifier.

7. The method of claim 6 further comprising:

looping said actual value back to said numerical control whereby full functionality of said first control system with respect to said at least one axis continues to be available for utilization.

8. The method of claim 6 wherein said second control system is activated via an axis which in a set position is synchronized with the axis controlled by the first control system.

9. The method of claim 6 further comprising:

converting the signal shape required for said second control system to a shape required for an actual value input in said numerical control, and, looping converted shape signal to the actual value input.

10. The method of claim 6 wherein a pulse-phase comparison is used to produce said differential.

11. The method of claim 6 wherein a sine-phase comparison is used to produce said differential.

12. The method of claim 10 wherein a speed differential for speed control is formed by way of phase comparison with differentiation of the position differential and wherein said drive amplifier is operated in moment control.

13. The method of claim 11 wherein a speed differential for speed control is formed by way of phase comparison with differentiation of the position differential and wherein said drive amplifier is operated in moment control.

14. The method of claim 6 further comprising:

superimposing an analog positioning set value in real time on a signal of said differential to provide a positioning correction variable.

15. The method of claim 6 wherein the positioning set value for the second control system is read directly from the first control system and processed in the numerical control.

16. The method of claim 6 wherein a sensor is used to detect the speed of said at least one axis, the signal from said sensor being processed in a speed control of said second control system.

17. The method of claim 6 wherein said second control system communicates directly with said first control system via the set value and the actual value.

18. The method of claim 6 wherein a sensor is used to detect the acceleration of said at least one axis, the signal from said sensor being processed in a speed control of said second control system.

* * * * *

UNITED STATES PATENT AND TRADEMARK OFFICE
CERTIFICATE OF CORRECTION

PATENT NO : 6,011,374
DATED : January 4, 2000
INVENTOR(S): Dieter Ulbrich

It is certified that error appears in the above-identified patent and that said Letters Patent is hereby corrected as shown below:

On the Title page, item (30), the priority country "United Kingdom" is incorrect, the correct country is --Germany--.

Signed and Sealed this

Twenty-sixth Day of December, 2000

Q. TODD DICKINSON

*Attest:*

*Attesting Officer*          *Director of Patents and Trademarks*